United States Patent [19]

Drori

[11] Patent Number: 4,880,537

[45] Date of Patent: * Nov. 14, 1989

[54] MULTIPLE DISC TYPE FILTER AND DISC CONSTRUCTION USEFUL THEREIN

[76] Inventor: Mordeki Drori, 89 Zahal Street, Kiron, Israel

[*] Notice: The portion of the term of this patent subsequent to May 17, 2005 has been disclaimed.

[21] Appl. No.: 167,999

[22] Filed: Mar. 14, 1988

Related U.S. Application Data

[63] Continuation of Ser. No. 850,146, Apr. 10, 1986, Pat. No. 4,744,901.

[30] Foreign Application Priority Data

Apr. 10, 1985 [IL] Israel ..................................... 74873

[51] Int. Cl.$^4$ ............................................. B01D 25/02
[52] U.S. Cl. ................................. 210/323.1; 210/488; 210/541; 210/542
[58] Field of Search ...................... 210/323.1, 492, 542, 210/335, 488, 499, 541, 340, 542

[56] References Cited

U.S. PATENT DOCUMENTS

| | | | |
|---|---|---|---|
| 226,271 | 4/1880 | Blaisdell | 210/488 |
| 428,307 | 5/1890 | Leland | 210/488 |
| 730,485 | 6/1903 | Simoneton | 210/488 |
| 1,581,998 | 4/1926 | Fulcher . | |
| 1,642,864 | 9/1927 | Williams | 210/488 |
| 1,643,299 | 9/1927 | Furness | 210/488 |
| 1,719,346 | 7/1929 | Thompson . | |
| 1,797,099 | 3/1931 | Boulade . | |
| 1,804,512 | 5/1931 | Pickard | 210/492 |
| 1,849,042 | 0/0000 | Pickard . | |
| 1,852,873 | 4/1932 | Berger . | |
| 1,906,391 | 5/1933 | McKinley | 210/413 |
| 1,926,557 | 9/1933 | Perkins . | |
| 1,929,246 | 10/1933 | Hechenberkner . | |
| 1,976,547 | 10/1934 | Dumas . | |
| 2,137,556 | 11/1938 | Young | 210/488 |
| 2,330,945 | 10/1943 | Becker . | |
| 2,365,525 | 12/1944 | Cox . | |
| 2,374,756 | 5/1945 | Kisch et al. . | |
| 2,455,486 | 12/1948 | Hicks . | |

(List continued on next page.)

FOREIGN PATENT DOCUMENTS 126722 2/1948 Australia .

(List continued on next page.)

OTHER PUBLICATIONS

Spielman, Lloyd A., "Particle Capture From Low-Speed Laminar Flows", Am. Rev. Fluid Mech., 1977, 9: 297–319.

Primary Examiner—Frank Sever
Attorney, Agent, or Firm—Cushman, Darby & Cushman

[57] ABSTRACT

A disc-type filter including a housing having an inlet connectable to an upstream pipe, and an outlet connectable to a downstream pipe; and a stack of discs disposed within the housing for separating solid particles from a fluid flowing between the discs from the upstream side of the stack to the downstream side thereof; characterized in that the stack includes:

a plurality of cooperating filter elements defining a plurality of paired co-operating filter surfaces, including a first surface having a large surface area and a second surface contacting only a portion of the large surface area of the first surface and leaving a portion of the large surface area on the upstream side of the stack not contacted thereby, at least one of said first and second surfaces being formed with grooves at the areas at which the first and second surfaces contact, thereby to form:

(a) compartments on the upstream side of the stack for accumulation of solid particles; and
(b) edge filtering passageways extending along the grooves in contact with the second surface, which passageways define the minimum size of particles separated by the filter and extend from the compartments to the downstream side of the stack, and wherein the second surface is formed with serrated edge surfaces defining the compartments on the upstream side of the stack, thereby increasing the length along which edge filtering passageways are defined.

17 Claims, 11 Drawing Sheets

U.S. PATENT DOCUMENTS

| | | |
|---|---|---|
| 2,495,095 | 1/1950 | Ewbank . |
| 2,519,506 | 8/1950 | Russell . |
| 2,554,016 | 5/1951 | Czarnecki ........................... 210/492 |
| 2,575,995 | 11/1951 | Briggs . |
| 2,583,423 | 1/1952 | Halinan . |
| 2,631,732 | 3/1953 | Vocelka ............................. 210/492 |
| 2,654,440 | 10/1953 | Robinson ........................... 210/492 |
| 2,670,851 | 3/1954 | Curtis . |
| 2,692,686 | 10/1954 | Fleck .................................. 210/488 |
| 2,702,637 | 2/1955 | Shepard ............................. 210/492 |
| 2,757,802 | 8/1956 | Schmid . |
| 2,847,126 | 8/1958 | Goodman . |
| 2,855,106 | 10/1958 | English . |
| 2,873,030 | 2/1959 | Ashton ............................... 210/488 |
| 2,978,108 | 4/1951 | Strassheim ......................... 210/488 |
| 3,005,556 | 10/1961 | Jensen ................................ 210/488 |
| 3,105,042 | 9/1963 | Roosa . |
| 3,111,963 | 11/1963 | Brockwell .......................... 210/492 |
| 3,195,730 | 7/1965 | Muller . |
| 3,370,712 | 2/1968 | Smith ................................. 210/492 |
| 3,382,982 | 0/0000 | Stevens . |
| 3,448,862 | 6/1969 | Kudlaty ............................. 210/488 |
| 3,473,668 | 10/1969 | Bunyard ............................ 210/492 |
| 3,503,511 | 3/1970 | Spitzberg .......................... 210/232 |
| 3,529,726 | 9/1970 | Keenan . |
| 3,561,602 | 2/1971 | Molitor . |
| 3,622,003 | 11/1971 | Czech . |
| 3,647,084 | 3/1972 | Martin . |
| 3,648,843 | 3/1972 | Pearson . |
| 3,666,107 | 5/1972 | Boggs ................................ 210/483 |
| 3,789,990 | 2/1974 | Drori . |
| 4,026,806 | 5/1977 | Drori . |
| 4,042,504 | 8/1987 | Drori . |
| 4,045,345 | 8/1977 | Drori . |
| 4,062,774 | 12/1977 | Hinojosa . |
| 4,067,812 | 1/1978 | Drori . |
| 4,115,274 | 9/1978 | Boddeker . |
| 4,156,651 | 5/1979 | Mehoudar . |
| 4,207,181 | 6/1980 | Drori . |
| 4,251,374 | 2/1981 | Cunningham . |
| 4,267,042 | 5/1981 | Hofmann . |
| 4,267,045 | 5/1981 | Hoof . |
| 4,271,018 | 6/1981 | Drori . |
| 4,278,540 | 7/1981 | Drori . |
| 4,295,963 | 10/1981 | Drori . |
| 4,297,209 | 10/1981 | De Visser et al. ................... 210/107 |
| 4,312,374 | 1/1982 | Drori . |
| 4,402,829 | 9/1983 | Cordua . |
| 4,410,430 | 10/1983 | Hagler et al. ....................... 210/446 |
| 4,430,232 | 2/1984 | Doucet . |
| 4,435,287 | 3/1984 | Sumimoto . |
| 4,468,319 | 8/1984 | Laakso . |
| 4,481,111 | 11/1984 | Christophe . |
| 4,517,089 | 5/1985 | Armand .............................. 210/488 |
| 4,552,655 | 11/1985 | Granot . |
| 4,552,662 | 11/1985 | Webster . |
| 4,572,784 | 2/1986 | Drori . |
| 4,624,785 | 11/1986 | Drori . |
| 4,642,182 | 2/1987 | Drori . |
| 4,654,143 | 3/1987 | Drori . |
| 4,655,910 | 4/1987 | Tabor . |
| 4,655,911 | 4/1987 | Tabor . |
| 4,683,060 | 7/1987 | Drori . |
| 4,689,148 | 8/1987 | Timm et al. ..................... 210/321.87 |
| 4,707,258 | 11/1987 | Drori . |
| 4,744,901 | 5/1988 | Drori ............................... 210/323.1 |

FOREIGN PATENT DOCUMENTS

| | | |
|---|---|---|
| 156599 | 5/1954 | Australia . |
| 156721 | 5/1954 | Australia . |
| 549633 | 12/1957 | Canada . |
| 586111 | 11/1959 | Canada . |
| 846245 | 8/1952 | Fed. Rep. of Germany . |
| 1007743 | 5/1957 | Fed. Rep. of Germany . |
| 1289827 | 5/1966 | Fed. Rep. of Germany . |
| 2453445 | 5/1978 | Fed. Rep. of Germany . |
| 899337 | 5/1958 | France . |
| 1157258 | 5/1958 | France . |
| 1543176 | 10/1968 | France . |
| 62288 | of 1983 | Israel ................................... 210/488 |
| 68288 | 4/1983 | Israel . |
| 473331 | 7/1952 | Italy . |
| 44-2926 | 2/1969 | Japan . |
| 10814 | of 1884 | United Kingdom ................ 210/488 |
| 300600 | 11/1928 | United Kingdom . |
| 570960 | 7/1945 | United Kingdom . |
| 571960 | 7/1945 | United Kingdom . |
| 687967 | 2/1953 | United Kingdom . |
| 841207 | 7/1960 | United Kingdom . |
| 926600 | 5/1963 | United Kingdom . |
| 1096739 | 12/1967 | United Kingdom . |

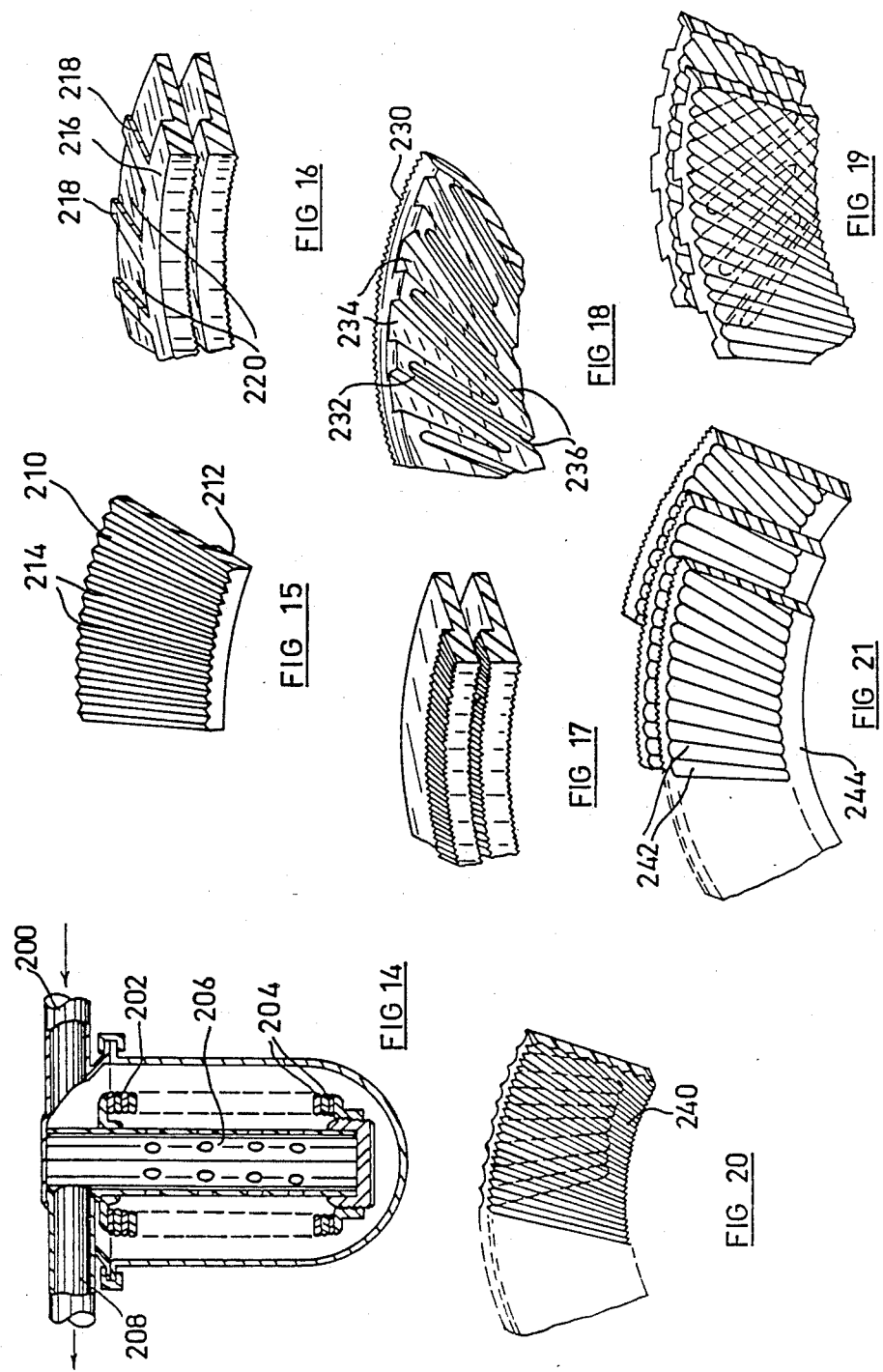

MULTIPLE DISC TYPE FILTER AND DISC CONSTRUCTION USEFUL THEREIN

This is a continuation of application Ser. No. 850,146, filed Apr. 10, 1986, now U.S. Pat. No. 4,744,901.

FIELD OF THE INVENTION

The present invention relates to multiple-disc filters useful in filtering particles from water and in many other applications.

BACKGROUND OF THE INVENTION

Multiple-disc type filters are known generally and include a housing in which is disposed a filter body in the form of a stack of like, centrally-apertured, filter discs of substantially uniform thickness along their widths. The individual discs have grooved side faces defining filtering channels between the adjacent discs in the stack.

Multiple-disc type filters have a number of advantages over other known types of filters, for example the cylindrical screen type filter, in that the multiple-disc filter has a relatively large capacity for removing and retaining dirt particles, since these may be retained between the side faces of the discs in addition to being retained on the upstream surface of the filter. The multiple disc filter is also characterized as being relatively easy to clean and resistant to rupture and is operative even at relatively low pressures.

In my copending U.S. patent application Ser. No. 709372, filed on Mar. 7, 1985 now U.S. Pat. No. 4,683,060 dated July 28, 1987 and claiming priority from Israel Patent Application 73923 there is described a disc-type filter including a housing having an inlet connectable to an upstream pipe, and an outlet connectable to a downstream pipe; and a stack of discs disposed within the housing for separating solid particles from a fluid flowing between the discs from the upstream side of the stack to the downstream side thereof; characterized in that the stack includes:

a plurality of cooperating filter elements defining a plurality of paired co-operating filter surfaces, including a first surface having a large surface area and a second surface contacting only a portion of the large surface area of the first surface and leaving a portion of the large surface area on the upstream side of the stack not contacted thereby, at least one of said first and second surfaces being formed with grooves at the areas at which the first and second surfaces contact, thereby to form:
  (a) compartments on the upstream side of the stack for accumulation of solid particles; and
  (b) edge filtering passageways extending along the grooves in contact with the second surface, which passageways define the minimum size of particles separated by the filter and extend from the compartments to the downstream side of the stack.

SUMMARY OF THE INVENTION

The present invention seeks to provide an improved disc-type filter of the type described generally in my aforesaid copending U.S. patent application.

There is thus provided in accordance with a preferred embodiment of the present invention, a disc-type filter including a housing having an inlet connectable to an upstream pipe, and an outlet connectable to a downstream pipe; and a stack of discs disposed within the housing for separating solid particles from a fluid flowing between the discs from the upstream side of the stack to the downstream side thereof; characterized in that the stack includes:

a plurality of cooperating filter elements defining a plurality of paired co-operating filter surfaces, including a first surface having a large surface area and a second surface contacting only a portion of the large surface area of the first surface and leaving a portion of the large surface area on the upstream side of the stack not contacted thereby, at least one of said first and second surfaces being formed with grooves at the areas at which the first and second surfaces contact, thereby to form:
  (a) compartments on the upstream side of the stack for accumulation of solid particles; and
  (b) edge filtering passageways extending along the grooves in contact with the second surface, which passageways define the minimum size of particles separated by the filter and extend from the compartments to the downstream side of the stack, and wherein the second surface is formed with serrated edge surfaces defining the compartments on the upstream side of the stack, thereby increasing the length along which edge filtering passageways are defined.

Further in accordance with a preferred embodiment of the present invention means are provided for maintaining the plurality of co-operating filter elements in predetermined desired relative azimuthal orientation with respect to the longitudinal axis of the stack.

Additionally in accordance with an embodiment of the present invention there is provided a disc-type filter including a housing having an inlet connectable to an upstream pipe, and an outlet connectable to a downstream pipe; and a stack of discs disposed within the housing for separating solid particles from a fluid flowing between the discs from the upstream side of the stack to the downstream side thereof; characterized in that the stack includes apparatus for maintaining the stack of discs in predetermined desired relative azimuthal orientation with respect to the longitudinal axis of the stack.

Further in accordance with an embodiment of the present invention, the second surface contacts the first surface such that a portion of the large surface area of the first surface at the downstream side of the stack is not contacted by the second surface.

Additionally in accordance with an embodiment of the invention, both the first and second surfaces contain grooves at the areas at which the first and second surfaces contact.

In accordance with one embodiment of the invention, the plurality of filter elements includes a first plurality of filter discs interspersed with a second plurality of spacer discs.

In accordance with an alternative embodiment of the present invention the plurality of filter elements includes a plurality of filter discs having the first surface formed on one face thereof and the second surface formed on an opposite face thereof.

Additionally in accordance with an embodiment of the invention the second surface where it contacts said first surface is flat.

Further in accordance with an embodiment of the invention the area of the first surface which is not contacted by the second surface is greater than the area of the first surface which is contacted by the second surface.

Additionally in accordance with one embodiment of the present invention, the first surface has grooves extending in a generally radial direction and the second surface defines upstream edges which are mostly circumferential in orientation.

In accordance with an alternative embodiment of the invention the first surface has grooves extending in a generally circumferential direction and the second surface defines upstream edges which are mostly radial in orientation.

Further in accordance with an embodiment of the invention, the second surface defines edges in a sinuous configuration.

According to an alternative embodiment of the present invention, the second surface defines accumulator grooves which are substantially wider than the grooves of the first surface, the grooves of the first surface being contacted by the crests of the accumulator grooves and being spaced from the valleys of the accumulator grooves.

According to one embodiment of the invention, the accumulator grooves extend generally in the radial direction and the grooves in the first surface also extend generally in the radial direction but at a different angle than the accumulator grooves.

According to an alternative embodiment of the invention, the accumulator grooves extend generally in the radial direction and the grooves in the first surface extend in the circumferential direction.

Further in accordance with an embodiment of the present invention, the grooves in said first surface are tapered, thereby to define a fluid flow passageway in the narrowed region thereof even when the remainder thereof is filled with particles.

BRIEF DESCRIPTION OF THE DRAWINGS

The invention will be understood and appreciated more fully from the following detailed description, taken in conjunction with the drawings in which:

FIG. 2b is a sectional view along lines b—b of FIG. 2a;

FIG. 2c is an enlarged view along lines c—c of FIG. 2a;

FIG. 14 is a sectional illustration of a non in-line filter which may employ filter elements in accordance with the present invention;

FIG. 15 is an illustration of a portion of a filter disc having a first surface defining grooves and a second surface which acts as a spacer;

FIG. 16 is an illustration of two stacked filter discs of the type illustrated in FIG. 15;

FIG. 17 is an illustration of two stacked filter discs of the general type illustrated in FIG. 15 but having grooved second surfaces;

FIG. 18 is an illustration of a filter disc having a first surface defining a slanted groove pattern and a second surface defining an accumulator groove pattern having an opposite slant;

FIG. 19 is an illustration of two stacked filter discs of the general type illustrated in FIG. 18;

FIGS. 20 and 21 are respective illustrations of a single filter disc and three stacked filter discs of the same configuration, each disc bearing first and second surfaces having the respective groove patterns which appear on separate discs in the embodiment illustrated in FIG. 12;

DETAILED DESCRIPTION OF THE DRAWINGS

Figure 1:
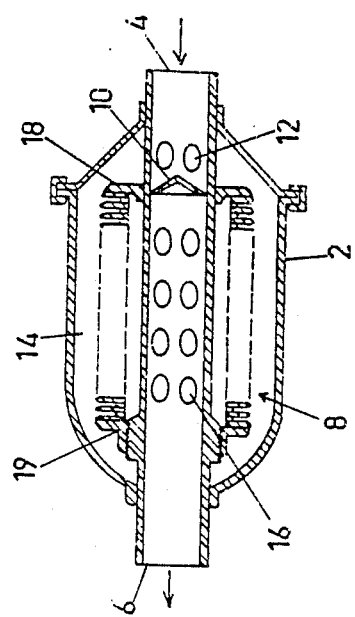
FIG. 1 is a longitudinal sectional view illustrating one form of filter constructed in accordance with the present invention.

The filter illustrated in FIG. 1 is of the in-line type including a housing 2 comprising an inlet 4 connectable to the upstream pipe and an outlet 6 connectable to the downstream pipe. Disposed within housing 2 is a filter body 8. The inlet includes a deflector 10 causing the inletted water to flow through inlet openings 12 to an annular chamber 14 around filter body 8, radially inwardly through the filter body 8, and then through outlet openings 16 to the housing outlet 6.

Filter body is of the multiple-disc-type, including a plurality of filter discs secured in a stack between end rings 18 and 19. Housing 2 is made of a plurality of sections which may be opened in order to provide access into the interior of the housing, and ring 19 is threadedly applied to one section to permit the filter discs of filter body 8 to be disassembled for purposes of cleaning or repair.

Such filters are well known and in extensive use today and therefore further details with respect to the construction, operation or cleaning of such filters are not necessary here.

As in the conventional multiple-disc-filter in use today, filter body 8 comprises a plurality of filter discs 20 (FIGS. 2a, 2b) of annular configuration and formed on both side faces with a plurality of grooves 22 extending generally in the radial direction; the term "generally radially" is intended to include grooves formed tangential to the opening through the filter disc, which grooved formation is also sometimes used.

Figure 2B:
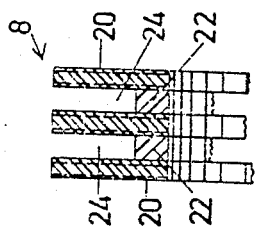
Figure 2A:
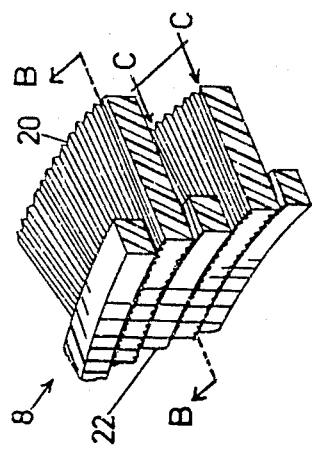
FIG. 2a is an enlarged fragmentary view illustrating the main elements of the filter stack in the filter of FIG. 1. according to one embodiment of the invention.

In the filter illustrated in FIGS. 1, 2a and 2b, the filter body 8 further includes a plurality of spacer members 22, there being one such member interposed between each pair of adjacent filter discs 20. The spacer members are of annular configuration and are disposed to contact only the inner portion of the grooved faces of the filter discs, this being the portion of the grooved faces on the downstream side of the stack; thus, the annular spacer members 22 do not contact the outer portion of the grooved faces of the filter discs 20, which grooved faces are on the upstream side of the filter stack. The provision of spacer members 22 to cover only a portion of the grooved faces of the filter discs 20 on the downstream side of the discs produces the following effects:

(a) The spacer members form compartments 21, as shown in FIG. 2b, on the upstream side of the stack for the accumulation of solid particles removed from the fluid inletted into the housing; these solid particles tend to settle within the grooves 21, 21b (FIG. 2c) of the filter discs 20, because there is a fluid flow through these grooves as will be described more particularly below.

(b) Spacer members 22 also form edge-filtering passageways along the upstream edges (outer edges) of the spacer members in contact with the grooved faces of the filter discs; these passageways actually define the size of the solid particles separated by the filter body 8.

(c) The provision of spacer members 22 produce further filtering passageways in the compartments 24, these latter passageways including the spaces between the particles settling within the grooves 20a, 20b of the filter discs, and extending through these grooves to the downstream side of the stack.

It will thus be seen that there is fluid flow not only through the grooves 21a, 21b covered by the upstream (outer) edge of the spacer members 22, but also through the portion of the grooves not covered by the spacer members. Because of the latter fluid flow, the particles will tend to settle within the portion of the grooves 21a, 21b not covered by the spacer members 22. This arrangement thus provides a large surface area of the filter discs to receive and retain the separated particles, and thereby distributes the separated particles over a larger surface area than, for example, in the conventional arrangement wherein the separate particles accumulate primarily at edge- filtering passageways. Accordingly, the described arrangement enables very substantial quantities of solid particles to be separated and retained within the filter before cleaning is required.

Figure 3:
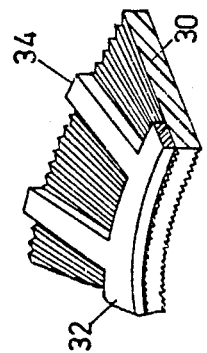

FIG. 3 illustrates a variation wherein the spacer members 32 are also of annular configuration but each includes a plurality of radial extensions 34 extending in the upstream direction to overlie the filter discs 30. These radial extensions 34 are provided primarily for mechanical purposes, to mechanically support the outer edges of the filter discs 30.

Figure 4:
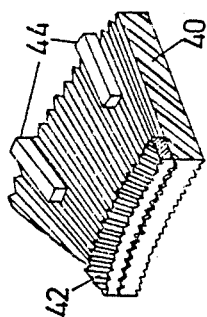
FIGS. 3 and 4 illustrate two modifications in the filter of FIG. 1.
Figure 2C:
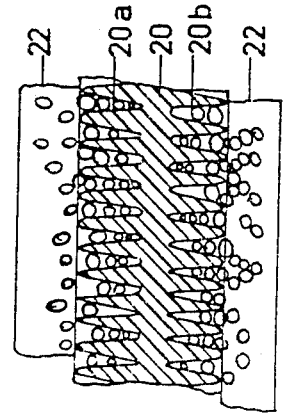

FIG. 4 illustrates another variation, wherein the filter discs 40 are formed along their outer (upstream edges, with a plurality of projections 44 for mechanically supporting the outer edges of the discs since their inner edges are spaced from each other by the annular spacer members 42 corresponding to members 22 in FIGS. 2a-2c.

Figure 5A:
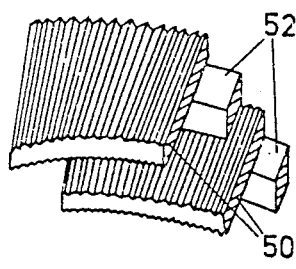
FIGS. 5a and 5b are views corresponding to FIGS. 2a and 2b but illustrating a further modification in the filter of FIG. 1.
Figure 5B:
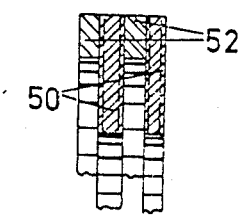

FIGS. 5a and 5b illustrate another variation wherein the annular spacer members 52 are interposed between the grooved filter discs 50 along their outer edges. This arrangement would be used when the fluid flow is in the radial outward direction, rather than in the radial inward direction, such that the uncovered portions of the grooved faces of the filter discs 50 would be on the upstream side of the stack, as described above.

Figure 6:
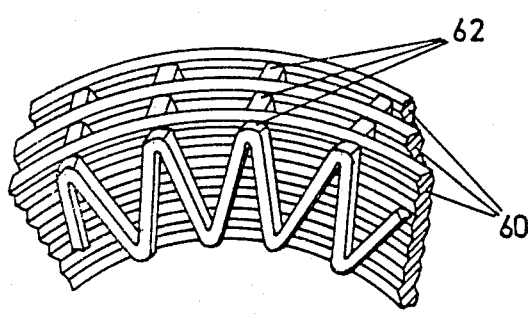
FIGS. 6–10, 10a and 11 illustrate further variations in the structure of the filter of FIG. 1.
Figure 7:
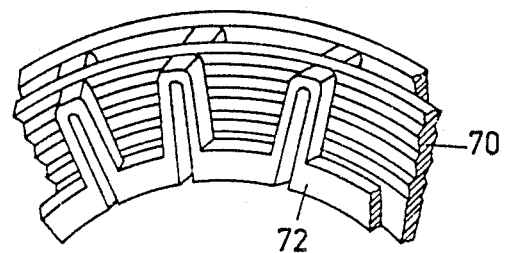
Figure 8:
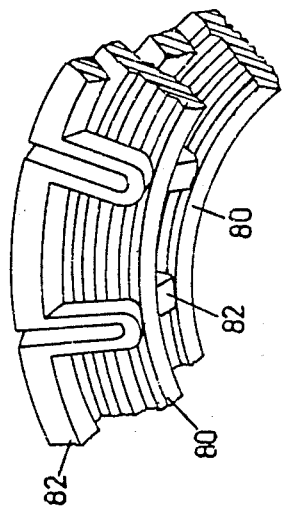

FIGS. 6-8 illustrate three arrangements wherein the spacer members, therein designated 62, 72 and 82, respectively, are of sinuous shape and include a plurality of curves or turns. In such shapes, the major portions of the spacer members extend generally in the radial direction with respect to the grooved filter discs 60, 70 and 80, respectively, and therefore the grooves in these filter discs extend in the circumferential direction rather than in the radial direction. Forming the spacer members 62, 72, 82 of sinuous configuration substantially increases the edge-filtering passageways defined by their upstream edges. In FIG. 6 and 7, the spacer members 62, 72, uncover larger surfaces of the disc grooved faces along the outer sides of the discs, and therefore the outer sides would be the upstream sides of the filter; i.e. the fluid would flow in the radially inward direction through the filter stack. In FIG. 8, however, the spacer members 82 uncover larger grooved surfaces at the inner sides of the filter discs 80, and therefore the inner sides would be the upstream sides; that is, the fluid would flow in the radially outward direction.

Figure 9:
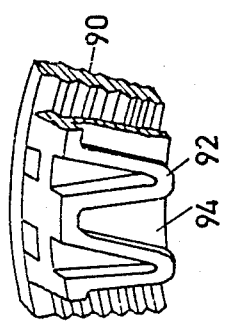

FIG. 9 illustrates an arrangement similar to that of FIG. 6, but including webs 94 interconnecting the turns of the spacer members 92 to provide mechanical reinforcement of the latter members. The interconnecting webs 94, however, are spaced from the ouer face of the respective filter disc 90 so as not to contact the grooved surfaces of the disc covered by the webs. Thus, the webs do not interfere with the function of the spacer member to define compartments (corresponding to compartments 24, FIG. 2b) for the accumulation of dirt particles within the grooves of the filter discs. It will be appreciated that since the grooves within the filter disc 60, 70, 80, are in the circumferential direction, the fluid flow will be in the radial direction on opposite sides of the spacer members but will be in the circumferential direction across the spacer members.

Figure 10:
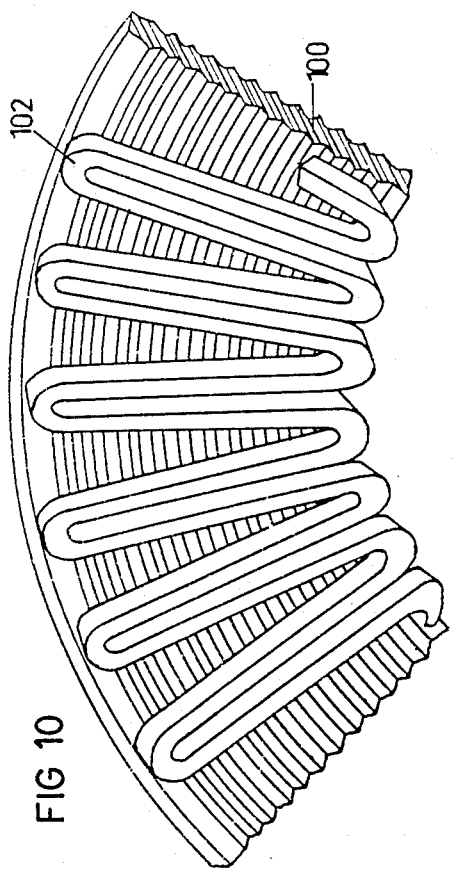
Figure 10A:
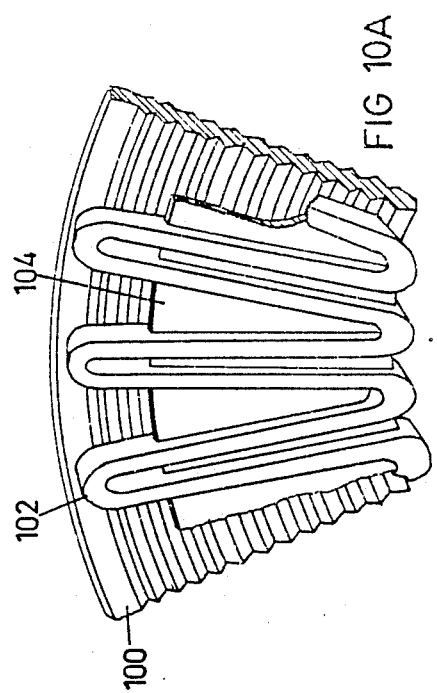

FIG. 10 illustrates another arrangement including spacer members 102 of sinuous configuration and providing large surface areas of the grooved discs 100 at the upstream side (outer side) of the filter discs not covered by the spacer members. FIG. 10a illustrates an arrangement similar to that of FIG. 10 but including webs 104 interconnecting the turns of the spacer members 102 to mechanically rigidify the spacer members.

Figure 11:
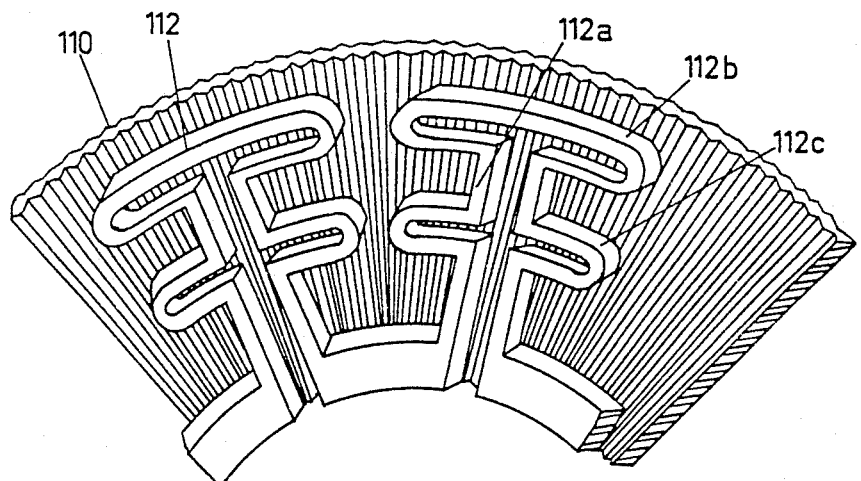

FIG. 11 illustrates a still further arrangement in which the filter discs 110 have radially extending grooves, and the spacer members 112 have a radially extending section 112a, and two circumferentially extending sections 112b, 112c. This arrangement is to provide a long edge-filtering passageway, defined by the upstream edge of the spacer members in contact with the grooved faces of the filter discs. It will be appreciated that in the arrangement illustrated in FIG. 11, the outer side of the filter disc 110 constitutes the upstream side of the stack, and therefore the fluid would flow in the radially inward direction.

FIGS. 12 and 12a–12c illustrate a still further variation, in which the spacer members 122 are formed with grooved faces, as shown at 122a, but these grooves are both substantially wider and deeper than the grooves 120a of the filter discs 120. As shown particularly in FIG. 12a, the inner portion 122b of the spacer members 122 is not grooved, but rather is flat and therefore contacts the grooves 120a of the filter discs. However, the outer grooved portion 122a of the spacer members, which latter portion constitutes the major surface area of the spacer members, are in contact only at their crests with groove 120a of filter discs 120, the valleys of the groove 122a being spaced from grooves 120a of the filter discs. Accordingly, the arrangement illustrated in FIGS. 12 and 12a–12c still define compartments, corresponding to compartments 24 in FIG. 2b, for the accumulation of solid particles, and also provide the large surface area filtering passageways for the flow of the fluid through the portions of the grooves 120a within these compartments to the downstream side of the spacer members.

It will be seen that, in the arrangement illustrated in FIGS. 12 and 12a–12c, the grooves 120a in the filter discs 120 extend in the radial direction, and the larger and deeper grooves 122a formed in the spacer members 122 also extend generally in the radial direction. However, the latter grooves are at a different angle than grooves 120a in the filter discs 120, so that the crests of grooves 122a will engage the crests of grooves 120a, and will not penetrate to the valleys within the latter grooves.

Figure 12:
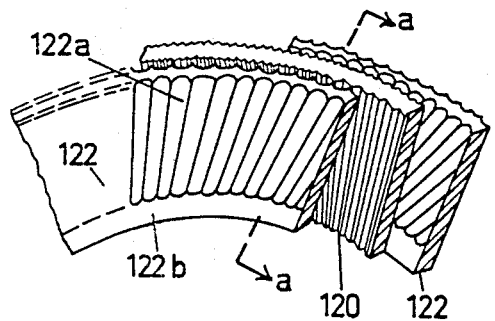
FIG. 12 illustrates a further construction which may be used in the filter of FIG. 1.
Figure 12A:
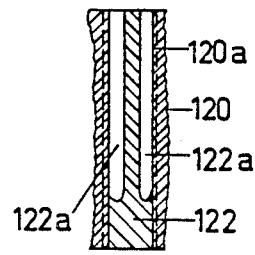
FIG. 12a is a sectional view along lines a—a of FIG. 12.
Figure 12B:
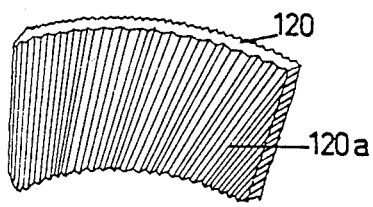
FIGS. 12b and 12c illustrate the construction of each filter disc and each separator disc in the filter of FIG. 12.
Figure 12C:
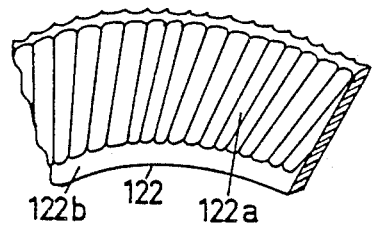
Figure 13A:
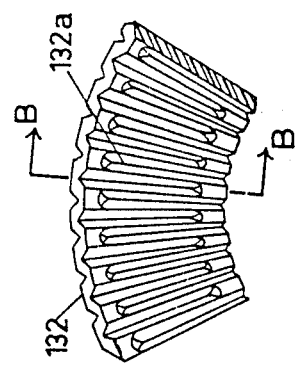
FIGS. 13, 13a, 13b and 13c are views corresponding to FIGS. 12, 12a, 12b and 12c, of a further modification in the construction of the filter.
Figure 13C:
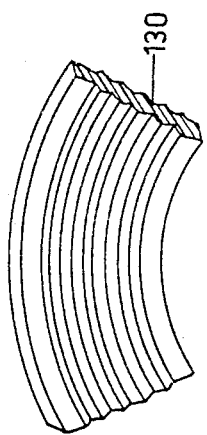
Figure 13:
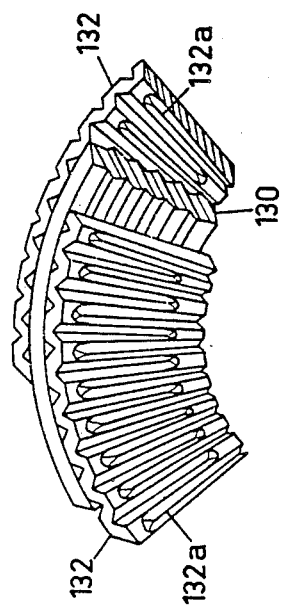
Figure 13B:
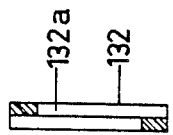

FIGS. 13 and 13a–13c illustrate an arrangement similar to that of FIG. 12, except that the filter discs, therein designated 130, are formed with circumferentially extending grooves, rather than radially extending grooves. The larger and deeper grooves 132a formed in the spacer members 132 extend in the radial direction, as in FIG. 12. In addition, the grooves 132a in FIG. 13 are of the V-shaped section, whereas the grooves 122a in FIG. 12 are of U-shape.

Reference is now made to FIG. 14, which shows an alternative filter structure, here termed a non in-line filter in which the filter discs of the present invention may be employed. Thus, it may be appreciated that the filter discs of the present invention may be employed in filters of the types illustrated in FIG. 1 and FIG. 14 and in any other suitable filter structure. In the embodiment of FIG. 14, a fluid inlet 200 communicates with the outer cylindrical surface 202 of a stack of filter discs 204. The fluid is filtered as it passes radially inward through the stack of filter discs and the filtered water passes out of the filter via a central apertured pipe 206 and a fluid outlet 208.

Reference is now made to FIG. 15 which illustrates a filter element or filter disc having first and second surfaces 210 and 212. In the illustrated embodiment, the first surface is formed with generally radially disposed grooves 214 which taper as they extend inwardly from the surface. The second surface 212 is formed as a spacer surface, typically smooth. As seen in FIG. 16, the second surface contacts the first surface of an adjacent filter disc along a relatively small area of contact therebetween. At this area of contact there are defined edge filtering passageways extending along the grooves in contact with the second surface, which passageways define the minimum size of particles separated by the filter. The areas of contact are configured to include a circumferential band 216 and a plurality of fingers 218 extending radially outward therefrom towards the upstream edge of the filter disc.

Fingers 218 and band 216 define a plurality of compartments 220 on the upstream side of the stack for accumulation of solid particles. It is a particular feature of a preferred embodiment of the present invention that the first surface side of the compartments is formed with grooves which communicate with the edge filtering passageways so as to provide a fluid flow path thereto even when the compartments are clogged with particles.

FIG. 17 shows an alternative embodiment of filter discs wherein the second surface is not smooth but grooved in such a way that the grooves thereon cannot seat in the grooves formed on the first surface. This construction provides enhanced filtering action. It is also noted that in the embodiment of FIG. 17, the fingers are eliminated. This configuration may be desirable in certain stack configurations wherein automatic flushing of the stacks is provided.

FIGS. 18 and 19 illustrate filter discs having grooves 230 on a first surface thereof and accumulator grooves 232 formed on a second surface thereof. The configuration of the accumulator grooves 232 is such that compartments 234 are defined at the upstream side of the stack for collecting particulate matter and relatively narrow channels 236 are defined for allowing the filtered water to reach the downstream side of the stack. It is noted that the slants of the grooves on the opposite surfaces is opposite to prevent blockage of the passageways defined by the grooves on the first surface.

Referring now to FIGS. 20 and 21, there is seen another example of filter discs having passageway defining grooves 240 on a first surface thereof and accumulator grooves 242 on a second surface thereof. It is noted that the second surface defines a circumferential band 244 adjacent the downstream side of the filter discs which lies against grooves 240 to define the filter passages in addition to those passages which are defined between crests of adjacent accumulator grooves 242 and valleys of passageway defining grooves.

It is noted that the groove configuration illustrated in FIGS. 20 and 21 is substantially identical to that described hereinabove in connection with FIG. 12. Here, however, both first and second surfaces are embodied in a single filter disc, whereas in the embodiment of FIG. 12, separate filter discs and spacer discs were employed.

Figure 22:
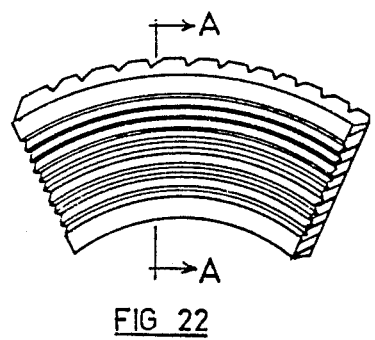
FIGS. 22, 23 and 24 are respective illustrations of a single filter disc and two stacked filter discs of the same configuration, each disc bearing first and second surfaces having the respective groove patterns which appear on separate discs in the embodiment illustrated in FIG. 13.
Figure 23:
Figure 24:
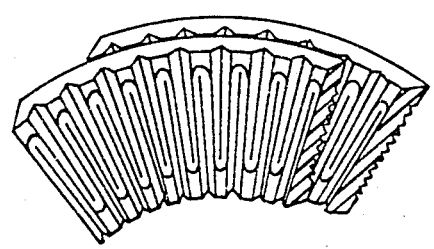

FIGS. 22, 23 and 24 illustrate filter discs having groove patterns which correspond to the patterns illustrated in FIG. 12 for separate filter discs and spacer discs. For the sake of conciseness, the groove configuration will not be repeated.

Figure 25:
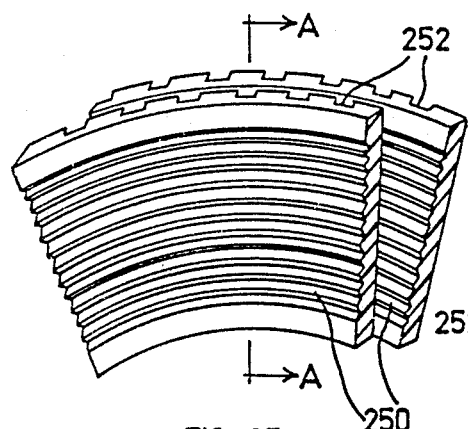
FIGS. 25, 26 and 27 are respective pictorial illustrations of both sides and a sectional illustration of two stacked filter discs of the same configuration, each disc bearing first and second surfaces having respective groove patterns.
Figure 26:
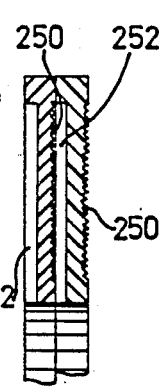
Figure 27:
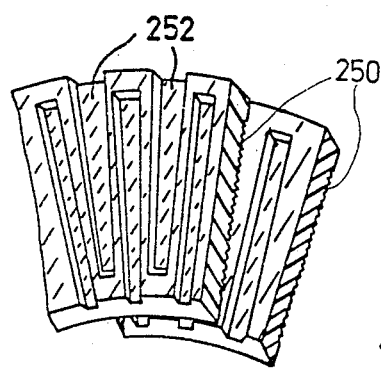

FIGS. 25, 26 and 27 illustrate filter discs having circumferential pattern defining grooves 250 on their first surfaces and radially extending accumulator grooves 252 defined on their second surfaces. It is a particular feature of this embodiment of the invention that a great number of individual filter pathways are defined by the repeated traversals of the circumferential passage defining grooves by the radially extending accumulator grooves 252.

Figure 30:
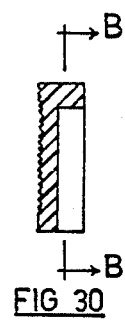
FIG. 30 is a sectional illustration of the filter disc of FIG. 28 taken along the lines A—A of FIG. 28.
Figure 28:
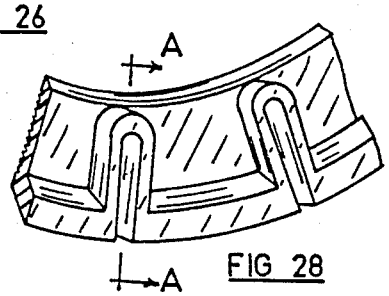
FIGS. 28 and 29 are respectively a pictorial illustration of a filter disc having another configuration and a partially cut away pictorial illustration of a stack of such filter discs.
Figure 29:
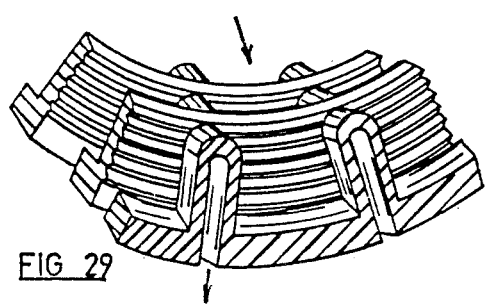

FIGS. 28, 29 and 30 illustrate an alternative embodiment of accumulator grooves formed on a second surface of a filter disc having circumferential passage defining grooves formed on its first surface. It is noted that FIG. 29 shows only the accumulator defining groove portion of the second surface of a filter disc, the remainder of the filter disc being cut away, for purposes of illustration.

Figure 31:
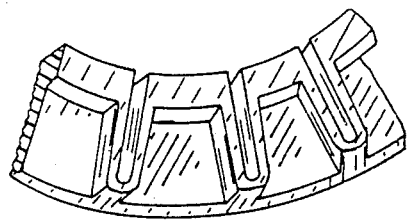
FIGS. 31 and 32 are respectively a pictorial illustration of a filter disc having yet another configuration and a partially cut away pictorial illustration of a stack of such filter discs.
Figure 32:
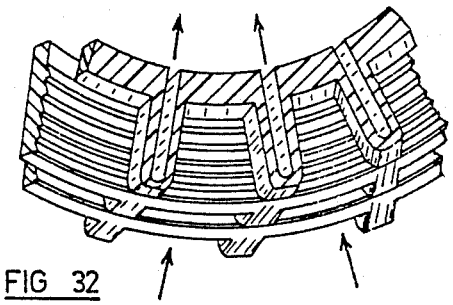

FIGS. 31 and 32 illustrate a further alternative embodiment of accumulator grooves formed on a second surface of a filter disc having circumferential passage defining grooves formed on its first surface. This configuration differs from that shown in FIGS. 28, 29 and 30 in that it is designed for a filter configuration wherein the upstream side is adjacent the radially outer cylindrical surface of the disc stack, while the configuration of FIGS. 28, 29 and 30 is designed for a configuration wherein the upstream side is adjacent the inner cylindrical surface of the disc stack. It is noted that FIG. 32 shows only the accumulator defining groove portion of the second surface of a filter disc, the remainder of the filter disc being cut away, for purposes of illustration.

Figure 33:
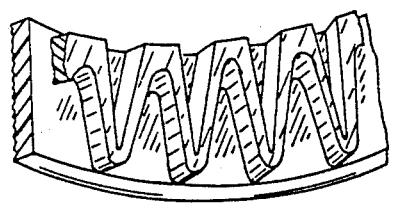
FIGS. 33 and 34 are respectively a pictorial illustration of a filter disc having still another configuration and a partially cut away pictorial illustration of a stack of such filter discs.
Figure 34:
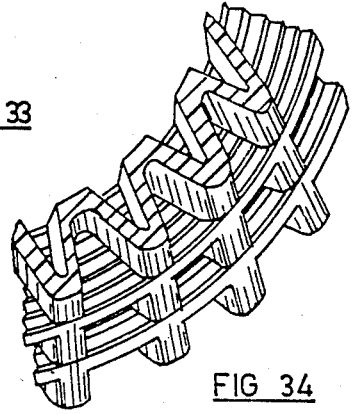

FIGS. 33 and 34 illustrate a further alternative embodiment of accumulator grooves formed on a second surface of a filter disc having circumferential passage defining grooves formed on its first surface. This configuration differs from that shown in FIGS. 28–32 in that it is designed for a filter configuration wherein the upstream side may be adjacent either the inner or outer cylindrical surfaces of the disc stack. It is noted that FIG. 34 shows only the accumulator defining groove portion of the second surface of a filter disc, the remainder of the filter disc being cut away, for purposes of illustration.

Figure 35:
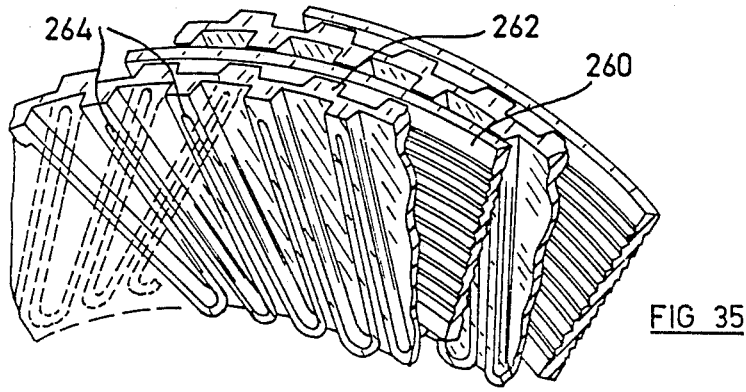
FIG. 35 is a pictorial illustration of a stack of filter discs having still another configuration.

Reference is now made to FIG. 35 which illustrates a stack of alternating filter discs 260 and spacer discs 262. Here, the spacer discs 262 are characterized in that they are formed with accumulator grooves 264 on their opposite sides which are tilted in opposite directions in order to provide enhanced structural strength to the spacer discs.

Figure 36:
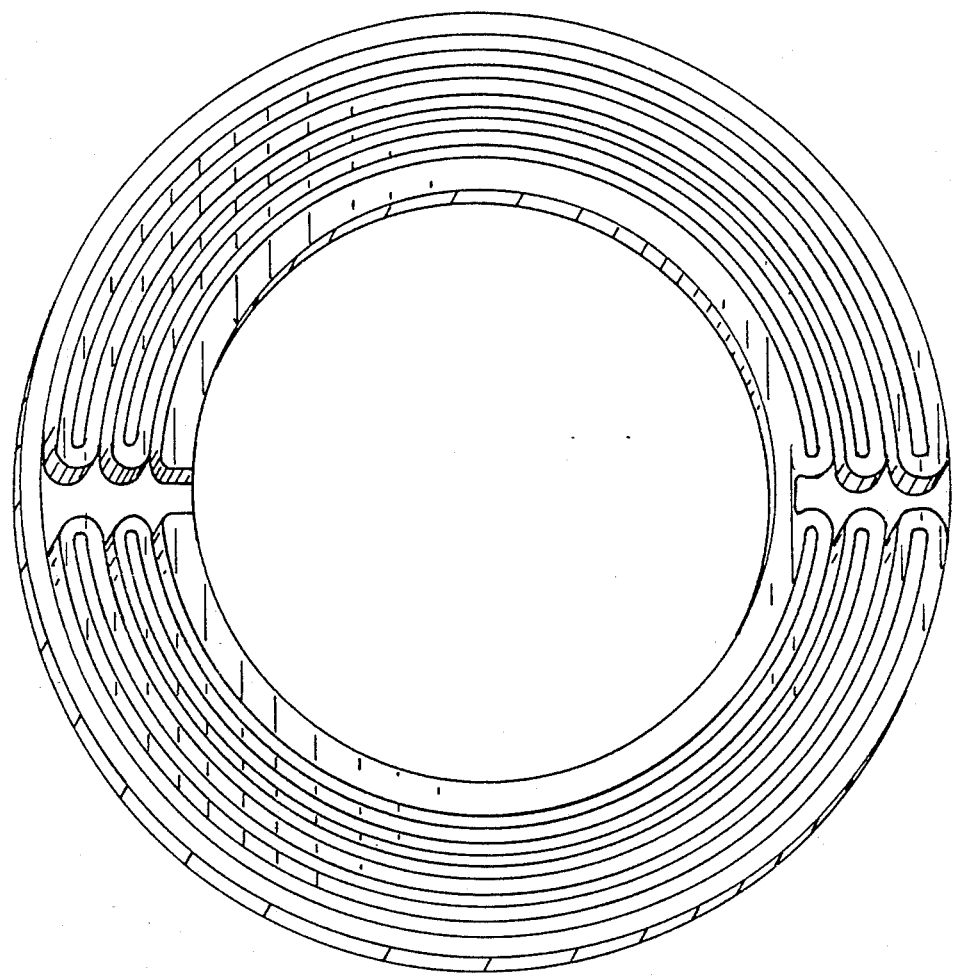
FIG. 36 is an illustration of a second surface of a filter disc having a plurality of upstream facing edges in generally circumferential orientation.

FIG. 36 illustrates a high efficiency arrangement of an accumulator groove which may be formed on the second surface of a filter disc or on a spacer disc. Here, the accumulator grooves extend in a back and forth circumferential orientation. The accumulator grooves are preferably disposed against a radially grooved filter disc or radially grooved first surface.

Figure 37:
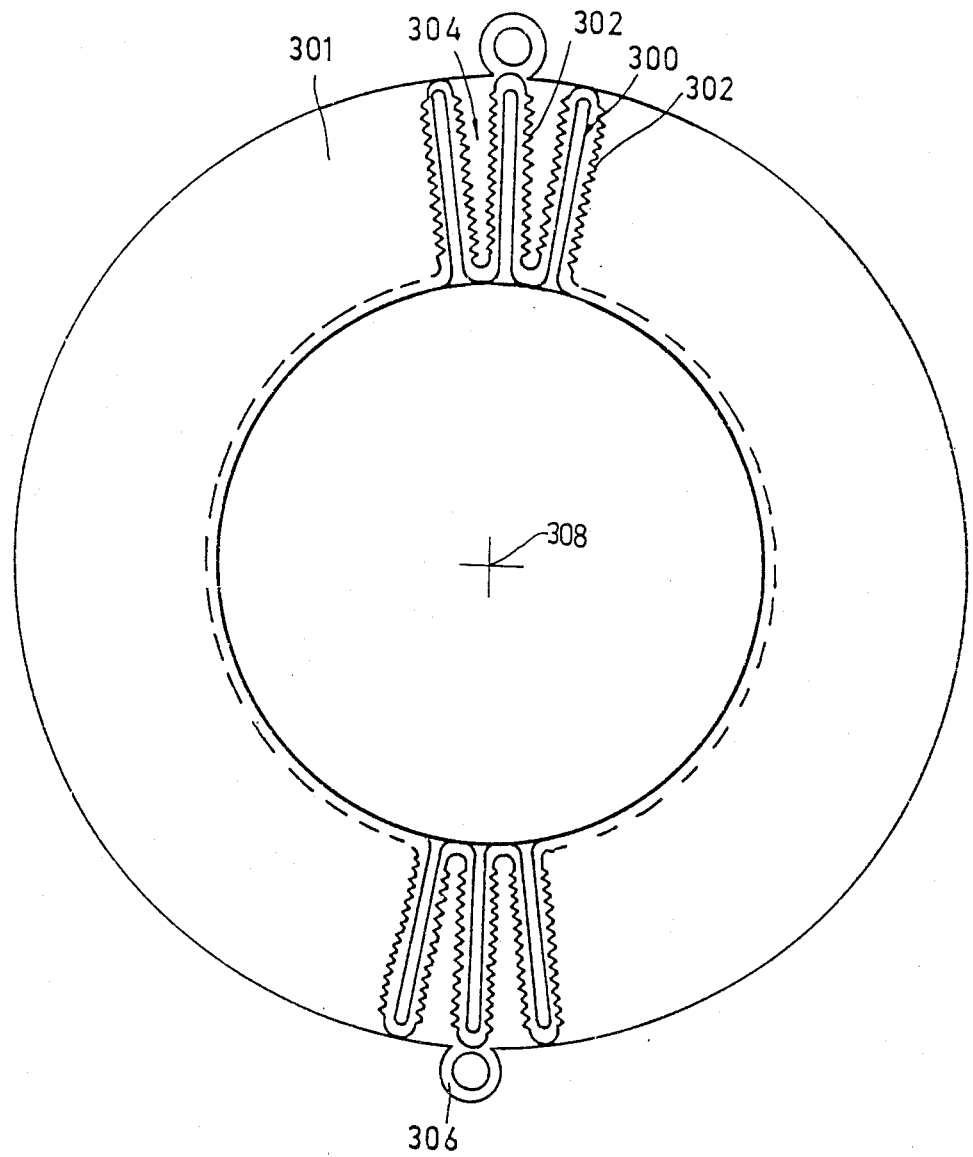
FIG. 37 is an illustration of a second surface of a filter element having serrated edges facing in the upstream direction and means for enabling a stack of such filter elements to be retained in a predetermined desired azimuthal orientation.

Reference is now made to FIG. 37 which illustrates a filter element having two additional features, both or either of which may be applied to all of the filter element configurations described hereinabove. FIG. 37 illustrates a second filter surface 300 of a filter element 301, which second filter surface 300 is shaped is sinuous configuration Instead of having relatively smooth edges as, for example, shown in the embodiments of FIGS. 3–11, second filter surface 300 has serrated edges 302. The term "serrated" is used herein to define an edge which is not generally smooth or straight but is conditioned so as to define an enlarged peripheral edge length and is not limited to the ordinary, possibly more limited, usual definition of the term. It is noted that the serrated edges are preferably arranged facing the upstream side of the filter stack so as to provide an enhanced edge length along which edge filtering passageways are defined. The upstream side is indicated by the arrow 304 which indicates the direction of water flow through the filter stack of elements 301.

Further in accordance with an embodiment of the present invention, each filter element 301 is provided with one or more azimuthal positioning elements 306, typically in the form of a ring. These elements are employed for maintaining the individual filter elements in a desired relative azimuthal orientation about the longitudinal axis 308 of the stack of elements. This predetermined longitudinal orientation may be important for providing maximum mechanical strength of the stack during operation at high pressures.

Figure 38:
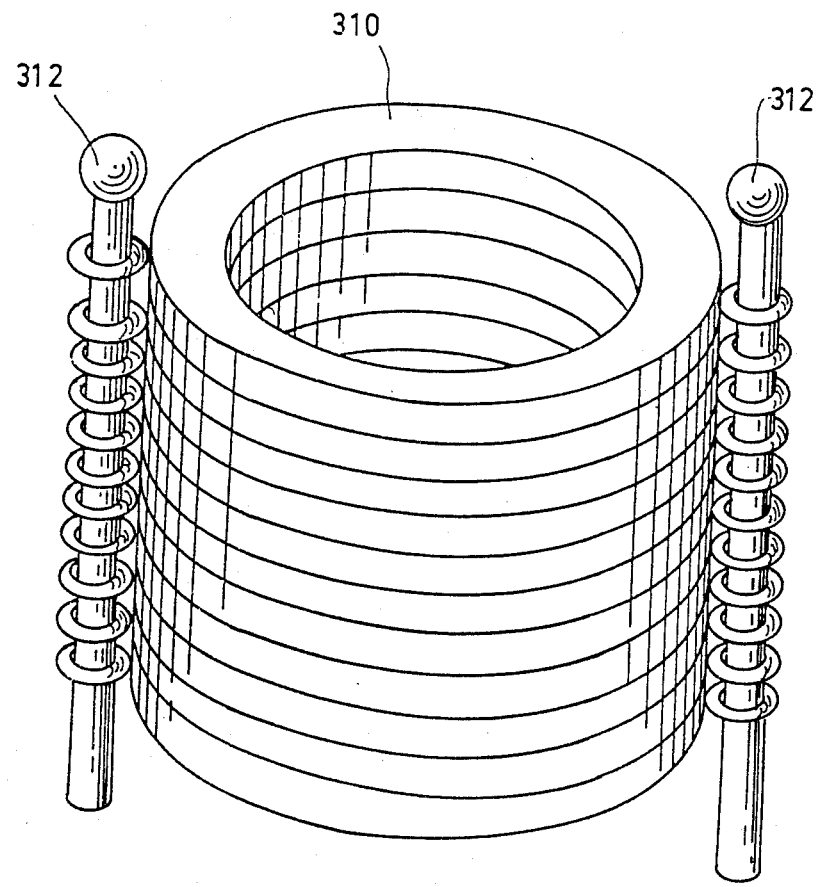
FIG. 38 is a pictorial illustration of a stack of filter elements of the type shown in FIG. 37 held together in a desired azimuthal orientation.

FIG. 38 illustrates a stack of filter elements 310 of the type illustrated in FIG. 37 joined together in predetermined relative azimuthal orientation by a pair of joining rods 312 which engage positioning element 306.

It will be appreciated by persons skilled in the art that the present invention is not limited by what has been particularly shown and described hereinabove. Rather the scope of the invention is defined only by the claims which follow:

We claim:

1. A filter including a housing having an inlet connectable to an upstream pipe, and an outlet connectable to a downstream pipe; and a stack of discs disposed within said housing for separating solid particles from a fluid flowing between said discs from the upstream side of said stack to the downstream side thereof; characterized in that said stack includes:

a plurality of cooperating filter elements defining a plurality of paired co-operating filter surfaces, including a first surface defining a large surface area and a second surface contacting only a portion of said large surface area of said first surface and leaving a portion of the large surface area on the upstream side of the stack not contacted thereby, at least one of said first and second surfaces being formed with grooves at the areas at which said first and second surfaces contact, thereby to form means enabling use of the filter in high pressure or corrosive environments including:

(a) compartments on the upstream side of the stack for accumulation of solid particles; and (b) edge filtering passageways extending along the grooves in contact with said second surface, which passageways define the minimum size of particles separated by the filter and extend from said compartments to the downstream side of the stack, and wherein said second surface is formed with serrated edge surfaces defining said compartments on the upstream side of the stack, thereby increasing the length along which edge filtering passageways are defined.

2. A filter according to claim 1 and wherein said first surface contains grooves in the areas of said compartments, which grooves communicate with said edge filtering passageways for permitting liquid flow therethrough even when said compartments become clogged.

3. A filter according to claim 1 and wherein said second surface contacts said first surface such that a portion of said large surface area of said first surface at the downstream side of ths stack is non-contacted by said second surface.

4. A filter according to claim 1 and wherein both said first and second surfaces contain grooves at the areas at which said first and second surfaces contact.

5. A filter according to claim 1 and wherein said first surfaces are alternated with said second surfaces.

6. A filter according to claim 1 and wherein said plurality of filter elements includes a first plurality of filter discs interspersed with a second plurality of spacer discs.

7. A filter according to claim 1 and wherein said plurality of filter elements includes a plurality of filter discs having said first surface formed on one face thereof and said second surface formed on an opposite face thereof.

8. A filter according to claim 1 and wherein said second surface where it contacts said first surface is flat.

9. A filter according to claim 1 and wherein the area of said first surface which is not contacted by said second surface is greater than the area of said first surface which is contacted by said second surface.

10. A filter according to claim 1 and wherein said first surface has grooves extending in a generally radial direction and said second surface defines upstream edges which are mostly circumferential in orientation.

11. A filter according to claim 10 and wherein said macro grooves extend generally in the radial direction and said grooves in said first surface also extend generally in the radial direction but at a different angle than said macro grooves.

12. A filter according to claim 10 and wherein said macro grooves extend generally in the radial direction and said grooves in said first surface extend in the circumferential direction.

13. A filter according to claim 1 and wherein said first surface has grooves extending in a generally circumferential direction and said second surface defines upstream edges which are mostly radial in orientation.

14. A filter according to claim 1 and wherein said second surface defines edges in a sinuous configuration.

15. A filter according to claim 1 and wherein said second surface defines macro grooves which are substantially wider than the grooves of said first surface, said grooves of the first surface being contacted by the crests of said macro grooves and being spaced from the valleys of said macro grooves.

16. A filter according to claim 1 and wherein said grooves in said first surface are tapered, thereby to define a fluid flow passageway in the narrowed region thereof even when the remainder thereof is filled with particles.

17. For use in a filter including a housing having an inlet connectable to an upstream pipe, and an outlet connectable to a downstream pipe, a filter assembly comprising:

a plurality of cooperating filter elements arranged in a stack and arranged to be disposed in said housing for separating solid particles from a fluid flowing between said elements from an upstream side of said stack to a downstream side thereof and defining a plurality of paired co-operating filter surfaces, including a first surface defining a large surface area and a second surface contacting only a portion of said large surface area of said first surface and leaving a portion of the large surface area on the upstream side of the stack not contacted thereby, at least one of said first and second surfaces being formed with grooves at the areas at which said first and second surfaces contact, thereby to form means enabling use of said filter in high pressure or corrosive environments including:

(a) compartments on the upstream side of the stack for accumulation of solid particles; and (b) edge filtering passageways extending along the grooves in contact with said second surface, which passageways define the minimum size of particles separated by the filter and extend from said compartments to the downstream side of the stack, and wherein said second surface is formed with serrated edge surfaces defining said compartments on the upstream side of the stack, thereby increasing the length along which edge filtering passageways are defined.

* * * * *